United States Patent [19]
Bauerfeind

[11] 3,908,363
[45] Sept. 30, 1975

[54] AERO GAS TURBINE AFTERBURNER CONTROL

[75] Inventor: Klaus Bauerfeind, Munich, Germany

[73] Assignee: Motoren- und Turbinen-Union Munchen GmbH, Germany

[22] Filed: July 2, 1973

[21] Appl. No.: 375,903

Related U.S. Application Data
[63] Continuation-in-part of Ser. No. 128,663, March 29, 1971, abandoned.

[30] Foreign Application Priority Data
Apr. 11, 1970 Germany............................ 2017380

[52] U.S. Cl..................................... 60/237; 60/261
[51] Int. Cl.²........................................... F02K 1/18
[58] Field of Search ............. 60/236, 237, 238, 239, 60/261

[56] References Cited
UNITED STATES PATENTS
| | | | |
|---|---|---|---|
| 2,805,544 | 9/1957 | Wells | 60/238 |
| 2,979,889 | 4/1961 | Hurtle et al. | 60/237 |
| 3,656,301 | 4/1972 | Katz | 60/237 X |

*Primary Examiner*—Clarence R. Gordon
*Assistant Examiner*—Robert E. Garrett
*Attorney, Agent, or Firm*—Craig & Antonelli

[57] ABSTRACT

Aero gas turbine engine equipped with an afterburner and a final nozzle having a variable discharge area in which a direct mechanical or electrical connection exists between the nozzle actuating mechanism and the afterburner fuel control unit for controlling the degree of after-burning as a function of the actual nozzle discharge area during transient engine operating conditions with the engine throttle moving in the afterburning range above a predetermined speed. A working line trim unit of limited authority is provided for making minor adjustments to the nozzle discharge area during steady state operation, while the degree of afterburning signal from the nozzle to the fuel control unit is held constant. This working line trim unit is locked out of the control cycle during transient operating conditions so as to assure the direct control of the degree of afterburning as a function of the actual discharge area during these transient conditions.

31 Claims, 6 Drawing Figures

ACCORDING TO EQUATION
$-y = (1 + RCD)x$

AERO GAS TURBINE AFTERBURNER CONTROL

This application is a continuation-in-part of application Ser. No. 128,663, filed Mar. 29, 1971, and now abandoned. The disclosure of this parent application is incorporated herein by reference to the extent necessary for a complete understanding of the disclosure of the present invention.

This invention relates to an aero gas turbine engine with an afterburner and with a final or thrust nozzle whose discharge cross-section is variable, whereby means are provided which, upon initiation of the afterburning and upon selection of the required afterburner fuel flow connected therewith, cause an adjustment of the discharge cross-section of the final nozzle.

The purpose of an afterburner, associated with aero gas turbine engines, is to additionally heat the engine exhaust gases in order to obtain additional thrust when a specific performance requirement is to be met.

This performance requirement may be variable, and, therefore, the fuel flow to be metered to the afterburner for the additional heating of the engine exhaust gases also has to be variable. A variable fuel flow resulting in a varying afterburner temperature requires the discharge cross-section of exhaust area of the final or thrust nozzle to be adjusted accordingly.

In aero gas turbine engines of any desired type of construction provided with an afterburner designed for a fully variable load, 2° of freedom are of predominant importance which can mismatch the basic engine to such an extent that hazardous operating conditions will occur (e.g., compressor surge or pumping). These 2° of freedom are the size of the final or thrust nozzle area and the fuel flow metered to the afterburner. Under steady state as well as also under transient conditions, the basic engine can only be operated close to an optimum operating characteristic when an optimum relationship exists between these two parameters.

In the past, this has been generally achieved by control systems in which the fuel flow is directly controlled by means of the throttle lever and in which a closed control circuit ensures that the final or thrust nozzle area is adjusted until the difference between the nominal and actual values of one or several engine parameters becomes zero. One disadvantage of these prior art systems is that, in the case of a rapid throttle lever movement, the variation in afterburner temperature is much more rapid than the variation in final nozzle area, so that more or less complicated devices are necessary to avoid compressor surge. All of these prior art devices, however, extend the response times and render failure analyses more critical, i.e., certain errors might result in severe damage to the basic engine.

An example of a closed loop system, as discussed above, is found in U.S. Pat. No. 3,656,301 to Katz. In this patent, control of the fuel flow relationship under both steady state and transient conditions is based on a continuous monitoring of the difference between the desired and actual fan exit mach number. Although the closed loop system of this patent does not require a very precise fuel metering system because its feedback action automatically eliminates errors in the fan running line position through its mach number control, this closed loop system is disadvantageous with respect to stability over the full flight envelope.

It is, therefore, an object of this invention to provide an aero gas turbine engine with an afterburner, which avoids the aforementioned disadvantages and at the same time also ensures extremely rapid acceleration of the afterburner without endangering the engine, for example, by compressor surging that might possibly occur. During rapid load changes — as determined by the thrust requirements — it is primarily to be ensured that an optimum relationship exists between the two parameters mentioned above, that is, the final nozzle area and the fuel flow to be metered for afterburner operation, i.e., that these two parameters must not mutually run away, i.e., must not show different tendencies during rapid load changes in order not to endanger the engine.

Another object of this invention is to meter the correct fuel quantity to the afterburner even in the case of an error in the final nozzle actuation to avoid any hazards for the engine.

As a solution to the above-mentioned problems for a turbo jet engine equipped with an afterburner, the present invention contemplates an arrangement such that, with a gas discharge area of the thrust nozzle selected by the pilot's throttle lever, a direct mechanical or electrical connection is provided between the thrust nozzle actuating mechanism and the afterburner fuel control unit which controls the degree of afterburning as a function of the actual final nozzle discharge or exhaust area.

According to a further feature of the present invention, an additional lead element or lead term can be interconnected in the case of an electrical connection which would compensate for any lag in the fuel supply to be metered to the afterburner by way of the fuel control unit.

In an engine according to the invention equipped with an afterburner, the fuel supply to the afterburner can be realized on the basis of the following relationship:

$$B_N = \beta [f(\phi_1) \cdot f(\phi_2) \cdot f(\phi_3) \ldots ]$$

where
$B_N$ = fuel flow (total afterburner fuel flow)
$\beta$ = degree of afterburning ($\beta_{min} < \beta < 1.0$) and
$\phi_1, \phi_2, \phi_3 \ldots$ = suitable engine parameters or engine intake conditions.

The permissible minimum degree of afterburning $\beta_{min}$ may depend under certain circumstances not only on the combustion problems but may also be a function of flight condition when afterburner fuel is used for cooling the hydraulic fluid of hydraulically operated engine auxiliaries as well as of the aircraft hydraulic fluids.

Within the purview of a further development of the invention, the fuel distribution to fuel injection means arranged in different burner regions of the afterburner can be effected upstream of these fuel injection means, located in different burner regions, on the basis of one or several metering functions which are independent of one another.

According to the invention, the fuel supply to the fuel injection means can be cut off separately or jointly by the afterburner fuel control unit as a function of the controlled degree of afterburning.

Thus, by cutting off the fuel supply to one or more than one zone or gallery of the fuel injection means under low-degree afterburning, an increase in the pressure drop across the burners remaining supplied with fuel can thus be achieved.

In order to achieve minimum afterburner acceleration times, it is necessary to fill the fuel supply lines to the burners, which are empty before ignition, within the shortest possible time; for this purpose, the pump delivery must be brought to its maximum value within a given time interval and then reduced to normal delivery when the lines are filled up to approximately 90%. After shutdown, the fuel in the supply lines is discharged into the atmosphere by means of the excess pressure prevailing in the afterburner. Complete evacuation of the fuel lines is an essential condition for a satisfactory and accurate filling operation as well as for the prevention of coking of the fuel.

Within the scope of a further feature of the present invention, an additional control unit (working line trimming unit with low authority) is provided, which operates under steady state conditions in dependence on certain of the engine performance parameters in order to positively ensure that no significant scatter of the basic engine operating characteristics will occur throughout the flight range, i.e., also under conditions of great differences in altitude. This additional control unit adjusts by means of signals that are due to the difference between the nominal and actual values of one or several engine parameters and with a constant afterburner fuel supply, the gas discharge area until the differences between the nominal and actual values of one or several engine parameters becomes zero.

It is further proposed, according to the present invention, that where an afterburner ignition mechanism is provided, an ignition signal is to unlock the gas discharge area of the thrust nozzle, which is only opened up to a certain degree as long as the afterburner has not ignited, and is adjusted to the preselected gas discharge area only when a signal is received on afterburner ignition.

According to a further feature of the invention, the thrust nozzle may be adjusted again into its neutral end position and the fuel supply to the afterburner may be cut off again, when the signal is cancelled upon afterburner flameout.

A still further feature of the invention is that under transient operating conditions (rapid change in throttle position), a locking signal is fed into this control unit (working line trimming unit of low authority), which operates in dependence on engine performance parameters, which locks the working line trim in the neutral position, hence producing no influence on the basic nozzle area-fuel flow relationship.

According to the present invention, an electronic control unit may be provided for the control of the aforementioned functions, which may possibly be combined with the other control unit (working line trim of low authority) into a single unit.

According to a further development of the inventive concept, the control of minimum afterburning can be effected as a function of engine parameters, which are fed into the electronic control device as signals.

These and other objects, features and advantages of the present invention will become more obvious from the following description when taken in conjunction with the accompanying drawing which shows for purposes of illustration only, one embodiment in accordance with the present invention.

Figure 1:
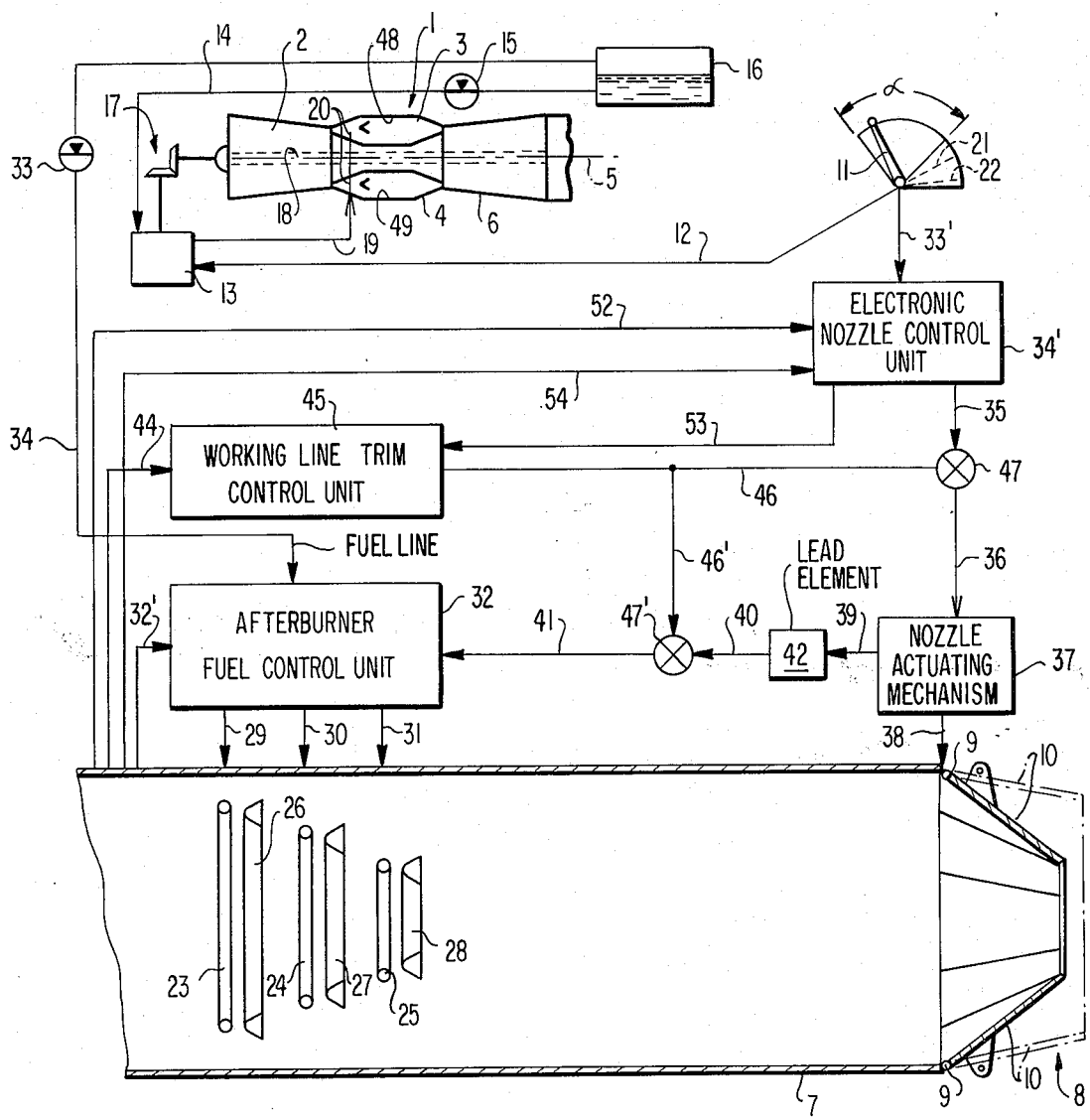
FIG. 1 is a schematic control diagram explanatory of the overall operation of the unit which is the subject of this invention, illustrating a turbo jet engine schematically and partially in cross-section.

Referring now to the drawing, and more particularly to FIG. 1, the aero gas turbine engine 1, schematically illustrated in the upper left part of this figure, comprises a compressor 2, an adjacent combustion section with combustion chambers 3, 4, on which several can be arranged coaxially to the engine longitudinal axis 5. A turbine 6 adjoins the combustion chambers 3, 4. The single-shaft turbo jet engine 1, as shown, could also be substituted by a multi-shaft turbo jet engine with several compressors and turbines. The basic engine (FIG. 1) comprising the aforementioned major units delivers its exhaust gas to an afterburner 7 (FIG. 1, bottom) with a final or thrust nozzle 8 at the end of its afterburner pipe. In this case, the thrust or final nozzle 8 consists, for example, of pivotably mounted flaps 10 which can be swivelled about transverse axes 9 at the afterburner pipe 7.

In the end position, shown in full lines, the flaps 10 form the minimum or neutral end position of the thrust nozzle 8, e.g., for cruising of an aircraft without afterburning. The end position of flaps 10, in broken lines, represents the fully opened thrust nozzle 8 with maximum gas discharge or exhaust area, for instance, in the case of maximum afterburning. In accordance with the additional thrust requirement, as determined by the selected degree of afterburning, various gas discharge areas of the thrust nozzle 8 between the two indicated end positions are to be coordinated by the adjustment of flaps 10.

In FIG. 1, reference numeral 11 indicates the throttle lever of turbine jet engine 1 to be operated by the aircraft pilot, whose maximum travel for basic engine acceleration is indicated by the angle $\alpha$. The throttle lever 11 is operatively connected to a conventional fuel control/governor 13 of the engine 1 by way of linkage 12, represented schematically in the drawing by a line. This fuel control unit 13 is supplied with fuel from tank 16 by way of a fuel line 14 and a fuel pump 15. The fuel control/governor 13 is driven by the engine shaft 18 by way of gears 17 and thus supplies the fuel as a function also of engine speed by way of a line 19 to fuel injectors 20 arranged within the combustion chambers 3, 4.

The desired nominal speed of the turbine jet engine 1 is preselected by the pilot by means of the throttle lever 11; the fuel control/governor 13 then causes a corresponding fuel quantity to be metered to fuel injectors 20 in accordance with the desired engine nominal speed.

When an additional thrust increase by afterburner operation is desired, then the throttle lever 11 is moved beyond the angle $\alpha$ into position 21, indicated by a dotted line, which, for example, is the controlling position for minimum afterburning; the position 22 of throttle lever 11, as shown by a dash and dotted line, can be the controlling position for maximum afterburning operation.

In order to be able to operate with afterburning and thus to heat anew the exhaust gases of basic engine 1, fuel injecting rings or manifolds 23, 24, 25 are provided on the inside of the afterburner pipe 7, in the illustrated case, e.g., in three sections, with associated flameholders 26, 27, 28 located downstream thereof. The fuel injecting manifolds 23, 24, 25 can be supplied with fuel by way of separate lines 29, 30, 31 and by way of an afterburner fuel control unit 32. The afterburner fuel control unit 32 also receives the fuel from tank 16 by way of the pump 33 and the supply line 34.

For the initiation of afterburner operation, the corresponding gas discharge cross-section of the thrust nozzle 8 is pre-selected, for example, by moving throttle lever 11 to either positions 21 or 22.

Figure 5:
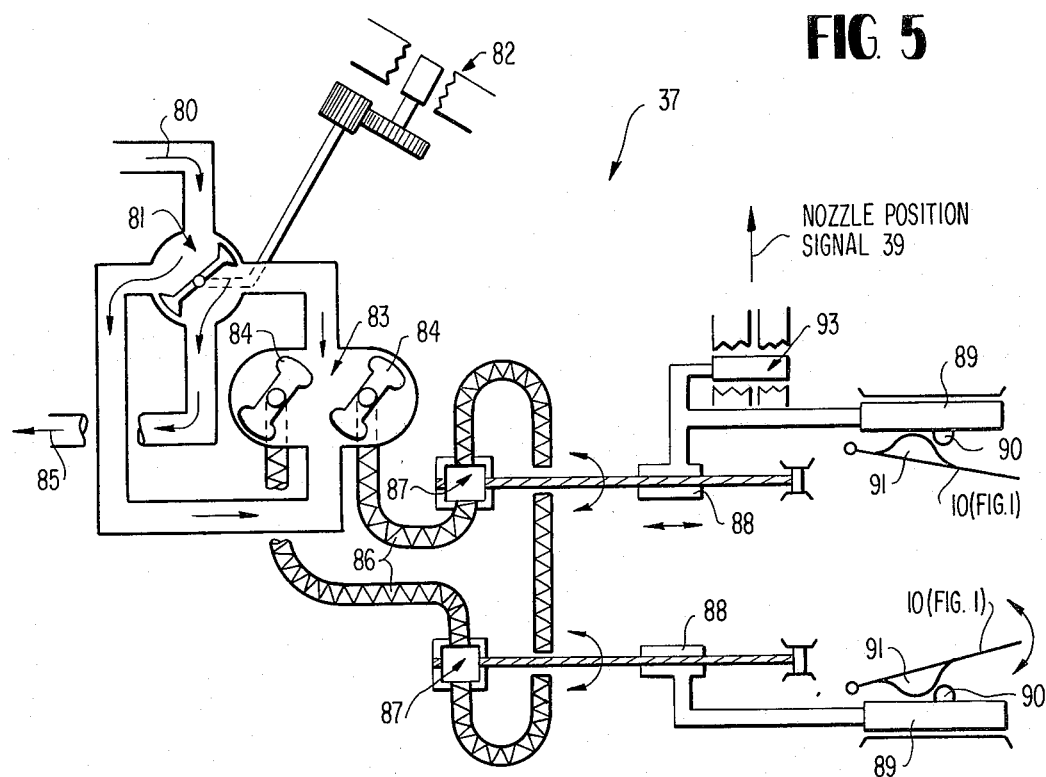
FIG. 5 is a detailed schematic illustration of the nozzle actuating mechanism 37 of FIG. 1.

When the throttle lever 11 is moved to positions 21 or 22 (outside of the normal engine operating range α), a signal 33' is fed into an electronic control unit 34', which operates the thrust nozzle actuating mechanism 37 by way of the signal flow 35, 36, as shown in FIG. 1. During transient operation with lever 11 moving above a predetermined speed, unit 34' generates locking signal 53 so as to prevent trimming signals 46 from affecting or modifying signal 35 such that signals 35 and 36 are the same during said transient conditions. The nozzle actuating mechanism 37 can consist of known hydraulic or pneumatic rams or rotary actuators which engage at and operate the nozzle flaps 10 by way of a linkage (arrow 38). However, FIG. 5 and the description associated therewith relates to a specific actuating mechanism 37 that could be used with the present invention. According to the signal flow, as indicated by arrows 39, 40, 41, an electric or mechanical connection between the nozzle actuating mechanism 37 and the afterburner fuel control unit 32 can control the degree of afterburning as an unequivocal function of the actual gas discharge area of the final nozzle 8. That is, during transient operating conditions (with the throttle lever 11 being moved faster than a predetermined rate), the signal flow indicated by arrows 39, 40, 41 corresponds directly to the actual gas discharge area so as to directly adjust the degree of afterburning signal 41 to control unit 32 as an unequivocal function of the actual gas discharge area of the final nozzle 8. For further details regarding the generation of signals 39, 40, 41, see the description related to FIGS. 2 and 5. Also note that the locking signal 53 locks out or blocks working line trim signals 46 during transient operating conditions (fast moving throttle), so that the above-described positive control of degree of afterburning as a function of actual discharge area takes place.

Figure 2:
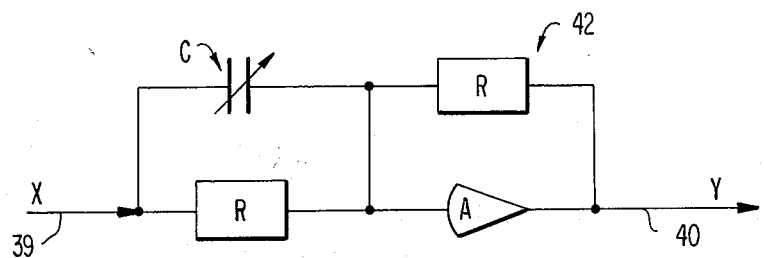
FIG. 2 is a schematic illustration of the lead element 42 of FIG. 1.
Figure 3:
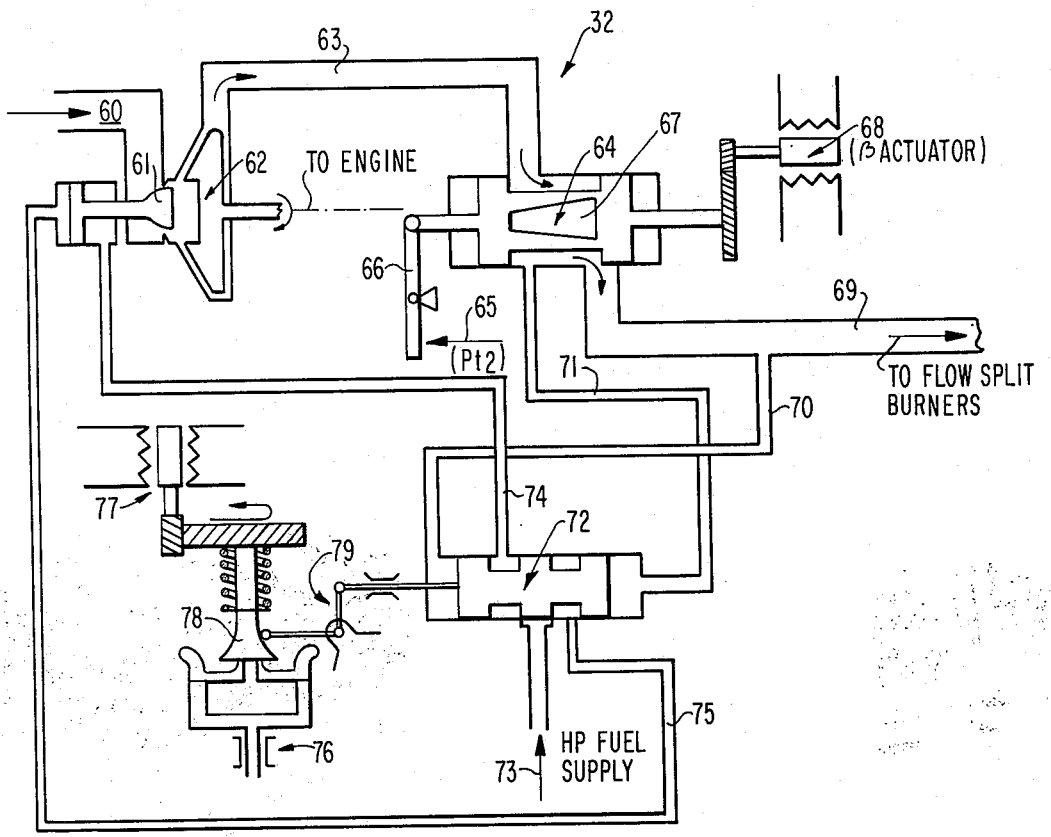
FIG. 3 is a detailed schematic illustration of the afterburner fuel control unit 32 of FIG. 1.

When an electrical connection is provided, an additional, conventional lead element or lead term 42 in the connection 39, 40 can be provided to compensate for any lag of the fuel to be metered to fuel injection manifolds 23, 24, 25 by way of the fuel control unit 32. Such a lead term 42 is schematically illustrated in FIG. 3, it being noted that such lead term in and by itself is of known construction. Referring to FIG. 2:

A = Amplifier  39 = actual nozzle position

R = Resistor
C = Capacitance
D = d/dt (operator)

-Continued
signal

40 = advanced nozzle position signal

With the aid of this schematically illustrated electrical circuit, a time constant $T_{FC}$ in the fuel control unit can be compensated during transient conditions, if the product of R times C equals $T_{FC}$, because:

$$\Delta B_N = \frac{K}{1 + T_{FC} D} \Delta \beta \text{ (at fixed } N_H; P_{t2} \text{ and } T_{t1}\text{)}*$$

and: $\Delta \beta = (1+RC\ D) \Delta A_{nozzle}$ hence: $\Delta B_N = \frac{k}{1+T_{FC}D}(1+RCP) \Delta A_{nozzle}$

* $N_H$ =rotational speed; $P_{t2}$ =total pressure at compressor outlet; and $T_{t1}$ =total temperature at compressor inlet.

In order to further ensure that steady state operating characteristics of the basic engine 1 do not show a significant scatter or deviation over the entire flight range (for example, in the case of marked differences in altitude), an additional control unit 45 is provided as a so-called working line trim of low authority which is controlled by engine performance parameters according to the signal flow as schematically indicated by reference numeral 44. This means that the normal relationship can only be trimmed by a small percentage, i.e., that a trimming of the normal relationship is possible only by a few percents so that in case of an error in this unit 45, a significant disturbance of the basic engine is avoided.

The purpose of control unit 45 (during non-transient operating conditions with said control lever 11 being stationary or moving below a predetermined rate so that locking signal is not generated) is to trim the gas discharge area of the thrust nozzle 8 in the case of a difference existing between the nominal and actual values of one or several engine performance parameters while the fuel flow by way of lines 29, 30, 31 to the afterburner injecting manifolds 23, 24, 25 remains constant. The trimming signal 46 from unit 45 changes via the summation point 47 the signal flow 35, 36, until the differences between the desired and actual values of one or several engine performance parameters have been compensated for by changes in the nozzle discharge area.

As soon as the control unit 45 senses a difference between the predetermined desired set of engine operating parameters and the actual engine operating parameters, it produces correcting signal 46 which is applied as a corrective measure to two different control lines at 47 and 47'. The first correction at 47 effects a demanded nozzle area position change and the second correction at 47' is of opposite direction and neutralizes the effect of the first signal of the degree of the afterburning via the nozzle control loop. Therefore, the correction signal 46 will only change the nozzle area but keep the degree of afterburning constant.

The locking signal 53 is produced in control unit 34' whenever the pilot's throttle 11 is moved faster than a preset value, causing transient condition (load change) of the afterburner. As soon as this locking signal is present, the working line trim signal 46 is put to zero.

Therefore, under transient conditions, the degree of afterburner fuel flow will be scheduled directly by the nozzle area position.

Signal flow line 44 in FIG. 1 schematically represent the following engine operating parameters which are utilized by unit 45 to generate the trimming signal 46:

$P_{t3}/P_{t4}$ = turbine pressure ratio
$N/\sqrt{T_{t1}}$ = compressor aerodynamic speed
$N$ = shaft rotational speed
$T_{t1}$ = total temperature at compressor inlet Using the turbine pressure ratio vs $N/\sqrt{T_{t1}}$ is just one out of a number of possible ways to control the compressor running line which is the actual task of the working line trim unit 45. The actual operation of this working line trim unit 45 is then as follows:

In the unit 45, an ideal line of $P_{t3}/P_{t4}$ vs $N/\sqrt{T_{t1}}$ is stored against which the actual value of $P_{t3}/P_{t4}$ at the prevailing $N/\sqrt{T_{t1}}$ is compared. The difference between the ideal as desired value and the actual measured value is magnified to produce the trim signal 46 and 46'. Under transient conditions with the locking signal 53 present, this magnification is zero, leading to a zero output for the trim signals 46 and 46'. The result of this trimming will in turn reduce the difference between the desired and actual turbine pressure ratios $P_{t3}/P_{t4}$ (and, hence, between the desired and actual compressor working lines) down to zero.

For afterburner ignition, a conventional igniter unit (not shown in the drawing) is to be provided which can be put into function by moving the throttle lever 11 into position 21 or 22 (shown as example) so that ignition fuel can be injected by way of ignition injectors 48, 49 arranged with combustion chambers 3, 4. Ignition signal 52 (indicative of actual lighting of the afterburner) is fed into the electronic control unit 34', whereby the flaps 10 of the thrust nozzle 8 are electrically unlocked by way of the thrust nozzle actuating mechanism 37.

As long as the afterburner has not ignited, the thrust or final nozzle 8 is pre-opened only slightly (with a consequent supply of fuel through unit 32 to support ignition) when the throttle lever 11 is moved; it is only when ignition signal 52 has actually reached the electronic control unit 34' that the final nozzle 8 opens to the gas discharge area pre-selected by throttle lever 11.

In the case of an afterburner flame-out, the signal 52 disappears and, under the action of the thrust nozzle actuating mechanism 37, the thrust nozzle 8 again reaches its neutral end position (as indicated by nozzle flaps 10 shown in solid lines), whereby, at the same time, the signal flow 39, 40, 41 causes the afterburner fuel control unit 32 to cut off the fuel supply to the injection rings 23, 24, 25.

Many afterburner ignition means of known construction, such as the one disclosed in U.S. Pat. No. 3,318,091 to Bader, can be used as the igniter unit for the present invention. The ignition signal 52 can be provided by known means such as a circuit connected with thermocouples installed upstream of, but in the vicinity of, the flameholders or with an optical device (pyrometer) looking at the flame zones. This signal 52 can then be connected in unit 34' in a manner known by itself such that, in the absence of signal 52, signal 35 is limited to a predetermined value corresponding to pre-opening of the nozzle to initiate the ignition step. For example, signal 52 could control a switch which blocks the full signal 35 unless signal 52 is present.

Control unit 34' includes appropriate delay circuits, of a construction known by themselves, for assuring that locking signal 53 is supplied during and shortly after the ignition sequence so as to assure a completed adjustment of the signal 41 as a direct function of actual discharge area prior to introducing the working line trim control unit into the circuit for modifying the signal 36 to the nozzle actuating mechanism 37.

The signal flow schematically illustrated by line 54 depicts control of minimum afterburning as a function of engine parameters fed by line 54 to control unit 34'. Since such minimum afterburning control can be effected by conventional means, details of the mechanisms therefor are not included herein.

The signal flow schematically illustrated by line 32' of FIG. 1 depicts fuel metering through the afterburner fuel control unit 32 as a function of certain engine operating parameters. FIG. 3 schematically illustrates details of such a control unit 32 which is responsive to degree of reheat or afterburning signal 41 and various engine operating parameters. From the following description of FIG. 3, it will be seen that the parameters 32' are different from the parameters 44 which govern the working line trim control unit 45.

Referring to FIG. 3, during afterburning, low pressure fuel enters the control at 60 (from fuel line 34 of FIG. 1) and passes to an inlet throttled centrifugal pump 62 which is driven at high speed by the engine. The pump raises the pressure of the fuel 63 and passes it to the fuel metering unit 64.

The fuel metering unit 64 comprises a metering valve into which is cut a special characteristic (67). This characteristic is designed so that the fuel flow to the burners obeys the following law:

$$B_N = f(A) \cdot \sqrt{\Delta P_A}$$

where $B_N$ = metered flow.
$A$ = characteristic flow area = $f(P_{t2}) \cdot f(\beta)$
$\sqrt{\Delta P_A}$ = Pressure drop across the characteristic flow area $67 = f(N)f(T_{t1})$
$N$ = shaft rotational speed
$T_{t1}$ = total temperature at compressor inlet The metering valve 64 is positioned as a function of $P_{t2}$ (total pressure at compressor outlet) and degree of reheat $(\beta)$ (signal 41, 68) in the following manner:

$P_{t2}$(65) acts upon a pivoted beam 66 which causes the metering valve to move axially while the degree of reheat signal 68 (signal 41 directly controlling rotation of 68) which is generated electrically, causes a controlled rotational action of the metering valve.

The pressure drop across the metering valve (71–70) is sensed by the ends of a pressure drop regulator 72. This regulator is supplied with an external source of high pressure fuel 73 which is used to supply control lines 74 and 75 to position the inlet throttle 61. This throttle maintains the required pressure drop across the metering valve 64.

As the pressure drop across the metering valve is required to be a function of $N$ and $T_{t1}$ (from the equation above), it is generated in the following manner:

Engine speed signal 76 drives a flyweight device which axially moves a three-dimensional cam 78 while the inlet temperature signal 77, which is produced electrically, rotates an electrical actuator to control the rotational position of the 3D cam 78. The 3D cam is designed to give a specific lift of the connecting linkage 79 as a function of $N$ and $T_{t1}$. This linkage, therefore, is connected to the pressure drop regulator 72 and introduces the N and $T_{t1}$ signal into the loop. The inlet valve 61 is, therefore, positioned until the required pressure drop across the metering valve is met. When this occurs and is sensed in the PDR by lines 71 and 70, the PDR is balanced and will maintain the required pressure drop until another position of the metering valve is selected. Signals 65, 76 and 77 correspond to signal flow 32' of FIG. 1.

In this simplified manner, the required schedule $$BN = \beta N.f(P_{t2}).f(T_{t1})$$

can be achieved.

Figure 4:
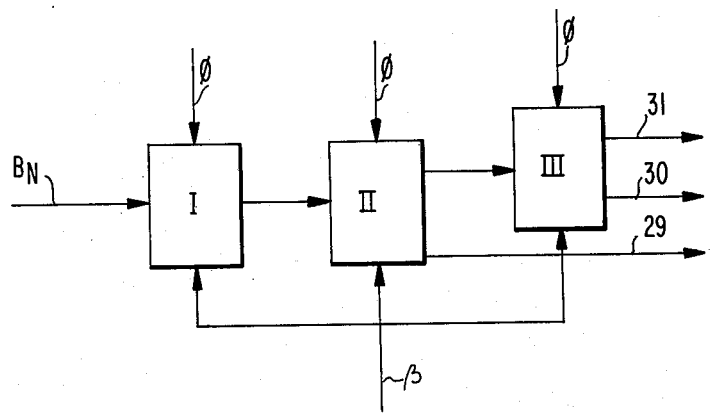
FIG. 4 is a schematic representation of an afterburner fuel metering system which forms a portion of unit 32 of FIGS. 1 and 3.

An afterburner fuel metering system, feeding more than one fuel injection zone within the afterburner can consist of a number of metering systems arranged as schematically depicted in FIG. 4.

Where I represents the total flow metering valve while II, III etc. are distribution valves which can shut down one or more than one of the fuel lines completely with reducing degree of afterburning, not affecting the totally metered flow $B_N$ and keeping the pressure drop relatively high across the injection means still in operation. As shown in the sketch, the fuel distribution can be made a function of the degree of afterburning selected as well as of the engine parameters $\phi$. In FIG. 1, this arrangement can be contained in box 32.

The propulsion nozzle actuating system 37 can use either a mechanical drive off the engine rotor, a separate hydraulic motor or a pneumatic motor. As an example, a system with a rotary type pneumatic motor will be described in conjunction with FIG. 5.

High pressure air from the engine compressor is fed into the unit 80 and passes to a selector valve 81. The position of the selector valve is dictated by an electrical actuator 82 which in turn is positioned by control signals 36 from the electrical nozzle control unit.

The selector valve 81 determines the direction of HP air flow to the pneumatic motor 83. The air flow rotates the motor blades 84 and is then vented overboard at 85. Attached to the motor blades is a flexible shaft forming a continuous loop around the outside of the engine jet-pipe.

Equi-spaced around the circumference of the jet-pipe are 4 screw-jacks 87 into which the flexible drive fits. Note: in the schematic only two screwjacks are shown for clarity. Therefore, the rotational movement generated by the air flow passing through the pneumatic motor and transferred to the flexible drive is, by means of the screwjacks, turned into simple axial motion parallel to the engine center line.

As the screwjack 87 is rotated by the flexible drive, it causes the "travelling nut" 88 to move parallel to the engine center line. Attached to the travelling nut is the nozzle shroud 89. Rollers 90 are attached to the nozzle shroud which run along cam profiles 91 rigidly fitted to the propulsion nozzle petals 92. Therefore, as the shroud moves axially, it causes the petals to open or close, dependent on the nozzle position signalled.

An indicating device 93 is also attached to the shroud to give the signal 39 (see FIG. 1) for use as nozzle feedback, position or nozzle acceleration indication.

Figure 6:
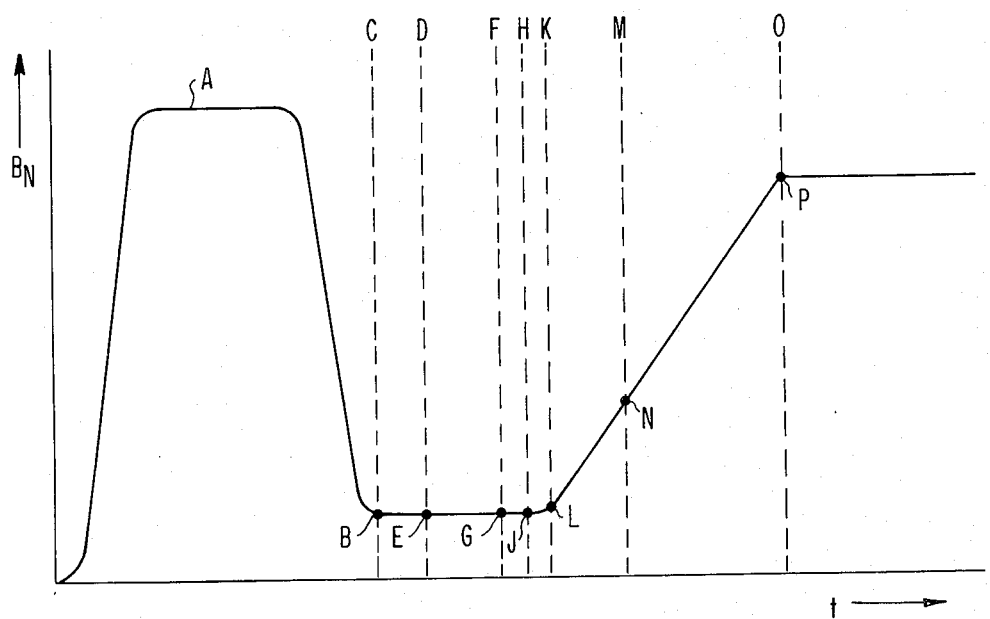
FIG. 6 is a diagram showing the acceleration cycle and afterburner fuel supply as a function of time for an engine utilizing the arrangement of the present invention.

FIG. 6 shows, in qualitative form, an acceleration cycle with the fuel flow $B_N$ as ordinate plotted against time $t$ as abscissa.

The steeply rising slope of curve A indicates the filling-up cycle of the fuel lines, e.g., lines 29, 30, 31 (FIG. 1), whereby the pump delivery reaches its maximum, and then rapidly drops again to point B where it goes back to normal fuel metering.

Line C through point B indicates the pre-opening cycle of the final or thrust nozzle 8 (FIG. 1) and the injection of ignition fuel through the injectors 48, 49 (FIG. 1).

Line D through point E indicates the initiation of the ingnition cycle.

Line F through point G indicates afterburner ignition, and line H through point I indicates that the electronic control unit 34' (FIG. 1) has received the ignition signal.

At point L (line K), the final or thrust nozzle 8 (FIG. 1) starts to move into its preselected end position. From point L, the fuel flow to the injection rings or manifolds 23, 24, 25 (FIG. 1) increases rapidly through point N (line M), representing minimum afterburning conditions, and reaches point P (line 0), representing maximum afterburning conditions.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend all such changes and modifications as are encompassed by the scope of the appended claims.

What is claimed is:

1. An installation for controlling the fuel supply to, and the nozzle discharge area of, an afterburner of a turbo jet engine; said installation comprising: a nozzle actuating mechanism including means for varying the nozzlle discharge area in response to a nozzle actuating input signal, variable position preselector means for directly controlling said actuating input signal as a function of the position of said preselector means, an afterburner fuel control unit for varying the fuel supply as a direct function of a degree of afterburning signal supplied thereto, connecting means operatively connected to said nozzle actuating mechanism for directly controlling said degree of afterburning signal as a direct function of the actual discharge nozzle area, and working line trim control means of limited authority responsive to changes in at least one engine operating parameter for varying said nozzle actuating input signal while maintaining said degree of afterburning signal constant until the difference between predetermined desired and actual values of said at least one engine operating parameter becomes zero.

2. An installation according to claim 1, wherein said working line control means includes means responsive to a plurality of engine operating parameters for said varying of said nozzle actuating input signal.

3. An installation according to claim 2, further comprising an afterburner ignition means including means for supplying an ignition signal from said afterburner, and means for varying said nozzle actuating input signal to pre-open said nozzle discharge area by a certain amount in immediate response to said ignition signal prior to ignition of said afterburner and to further open said nozzle to a position corresponding to the position of said preselector means in response to actual ignition of said afterburner.

4. An installation according to claim 2, further comprising means for varying said nozzle actuating input signal irrespective of the position of the preselector means for immediately closing said discharge area in response to disappearance of said ignition signal due to afterburner flameout.

5. An installation according to claim 4, further comprising means for feeding a locking signal to freeze said working line control means in a neutral non-effective condition for transient engine operating conditions.

6. An installation according to claim 5, wherein said means for feeding a locking signal include electronic control means.

7. An installation according to claim 6, wherein said electronic control means is combined into one unit with said working line trim control means.

8. An installation according to claim 6, wherein means are provided for controlling minimum afterburning as a function of engine parameter signals fed to said electronic control means.

9. An installation according to claim 1, further comprising an afterburner ignition means including means for supplying an ignition signal from said afterburner, and means for varying said nozzle actuating input signal to pre-open said nozzle discharge area by a certain amount in immediate response to said ignition signal prior to ignition of said afterburner and to further open said nozzle to a position corresponding to the position of said preselector means in response to actual ignition of said afterburner.

10. An installation according to claim 9, further comprising means for returning said nozzle discharge area to its minimum position and for cutting off the supply of afterburner fuel upon disappearance of the ignition signal due to an afterburner flameout.

11. An installation according to claim 10, further comprising means for feeding a locking signal to freeze said working line control means in a neutral non-effective condition for transient engine operating conditions.

12. An installation according to claim 11, wherein said means for feeding a locking signal include electronic control means.

13. An installation according to claim 1, wherein said fuel control unit includes fuel injection means arranged in different burner regions of the afterburner and means for metering fuel to all of said fuel injection means at a similar rate.

14. An installation according to claim 13, wherein said fuel control unit includes means for separately cutting off the fuel supply to each of the fuel injection means as a function of the controlled degree of afterburning.

15. An installation according to claim 13, wherein said fuel control unit includes means for jointly cutting off the fuel supply to all of the fuel injection means as a function of the controlled degree of afterburning.

16. An installation according to claim 1, further comprising means for feeding a locking signal to freeze said working line control means in a neutral non-effective condition for transient engine operating conditions.

17. An installation according to claim 1, wherein said preselector means includes a throttle lever.

18. An installation according to claim 1 wherein said connecting means includes means for providing a direct mechanical connection between said nozzle actuating mechanism and said fuel supply unit.

19. An installation according to claim 1 wherein said connecting means includes means for providing an electrical connection between said nozzle actuating mechanism and said fuel supply unit.

20. An installation according to claim 19, characterized in that an additional lead element is interconnected into the means for providing the electrical connection, said lead element including means for compensating for any possibly occurring lag of the fuel to be metered to the afterburner by the fuel control unit.

21. An installation according to claim 20, wherein said fuel control unit includes fuel injection means arranged in different burner regions of the afterburner and means for metering fuel to all of said fuel injection means at a similar rate.

22. An installation according to claim 20, wherein said fuel control unit includes fuel injection means arranged in different burner regions of the afterburner and means for metering fuel to said fuel injection means at different rates for at least some of said fuel injection means.

23. An installation according to claim 21, wherein said fuel control unit includes means for separately cutting off the fuel supply to each of the fuel injection means as a function of the degree of reheat signal.

24. An installation according to claim 21, wherein said fuel control unit includes means for jointly cutting off the fuel supply to all of the fuel injection means as a function of the degree of reheat signal.

25. An installation according to claim 8, characterized in that with fuel injection means arranged in different burner regions of the afterburner means, fuel metering is effected by at least one metering function feeding said fuel injection means in parallel.

26. An installation according to claim 8, characterized in that the fuel metering is effected by several metering functions, which are independent from one another for feeding said fuel injection means individually.

27. An installation according to claim 8, wherein said fuel control unit includes means for separately cutting off the fuel supply to each of the fuel injection means as a function of the degree of reheat signal.

28. An installation according to claim 8, wherein said fuel control unit includes means for jointly cutting off the fuel supply to all of the fuel injection means as a function of the degree of reheat signal.

29. An installation according to claim 1, wherein said afterburner fuel control unit includes means for controlling the amount of fuel supplied to the afterburner as a direct multiple of the degree of afterburning signal.

30. An installation according to claim 29, wherein said afterburner fuel control unit includes means for controlling the amount of fuel in direct correlation to the product of the degree of afterburning signal and a functional relationship of a set of engine operating parameters, said set of engine operating parameters including at least one engine operating parameter different than the at least one engine operating parameter which the working line trim control means is responsive to.

31. An installation according to claim 30, further comprising means for feeding a locking signal to freeze said working line control means in a neutral non-effective condition for transient engine operating conditions.

* * * * *